United States Patent [19]

Lodge et al.

[11] Patent Number: 4,523,366
[45] Date of Patent: Jun. 18, 1985

[54] AUTOMATED PIPET PLUGGING MACHINE

[75] Inventors: Daniel A. Lodge, Bridgeton; Donald D. Wheeler, Landisville, both of N.J.

[73] Assignee: Meteor Manufacturing & Machinery Co., Vineland, N.J.

[21] Appl. No.: 572,525

[22] Filed: Jan. 20, 1984

[51] Int. Cl.³ .............................................. B23Q 7/00
[52] U.S. Cl. .................... 29/564.6; 29/718; 29/790
[58] Field of Search ............ 29/33 R, 33 T, 564.6, 29/564.8, 566.1, 38 B, 718, 797, 235, 400 C, 38 R, 783, 773, 777, 790, 717

[56] References Cited

U.S. PATENT DOCUMENTS

| | | | |
|---|---|---|---|
| 2,749,602 | 6/1956 | Bakewell | 29/797 |
| 2,810,249 | 10/1957 | Wysocki | 29/773 X |
| 2,987,812 | 6/1961 | Donaldson | 29/773 X |
| 3,597,826 | 8/1971 | Shields | 29/777 |
| 3,605,240 | 9/1971 | Avery, Jr. et al. | 29/564.6 |
| 3,959,870 | 6/1976 | Klein | 29/790 |
| 4,001,929 | 1/1977 | Ishikawa | 29/235 X |
| 4,194,282 | 3/1980 | Byrd, Jr. | 29/235 X |
| 4,209,899 | 7/1980 | Dragotia | 29/783 |
| 4,274,194 | 6/1981 | Rizzo | 29/235 X |
| 4,398,327 | 8/1983 | Yamazaki | 29/564.8 |

FOREIGN PATENT DOCUMENTS 0059560 9/1982 European Pat. Off. ............ 29/564.6

Primary Examiner—William R. Briggs
Attorney, Agent, or Firm—B. P. Fishburne, Jr.

[57] ABSTRACT

Pipets of virtually any size are delivered automatically and continuously with the assistance of gravity to an intermittent rotary transport mechanism which carries each pipet separately to a plugging station. At the plugging station, each pipet is engaged and held against movement while precut cotton plugs are inserted into the pipets by a reciprocating needle device controlled by a mechanism which simultaneously controls and coordinates the activity of scissor blades which sever a cotton roving during a dwell of a roving transport wheel on the shaft of the pipet rotary transport mechanism. After being plugged, each pipet is delivered from the rotary transport mechanism onto a collection apron. A multi-position stop element on the inclined pipet delivery rails of the machine allows pipets of varying diameters to be plugged with precision without requiring additional machine adjustments.

17 Claims, 21 Drawing Figures

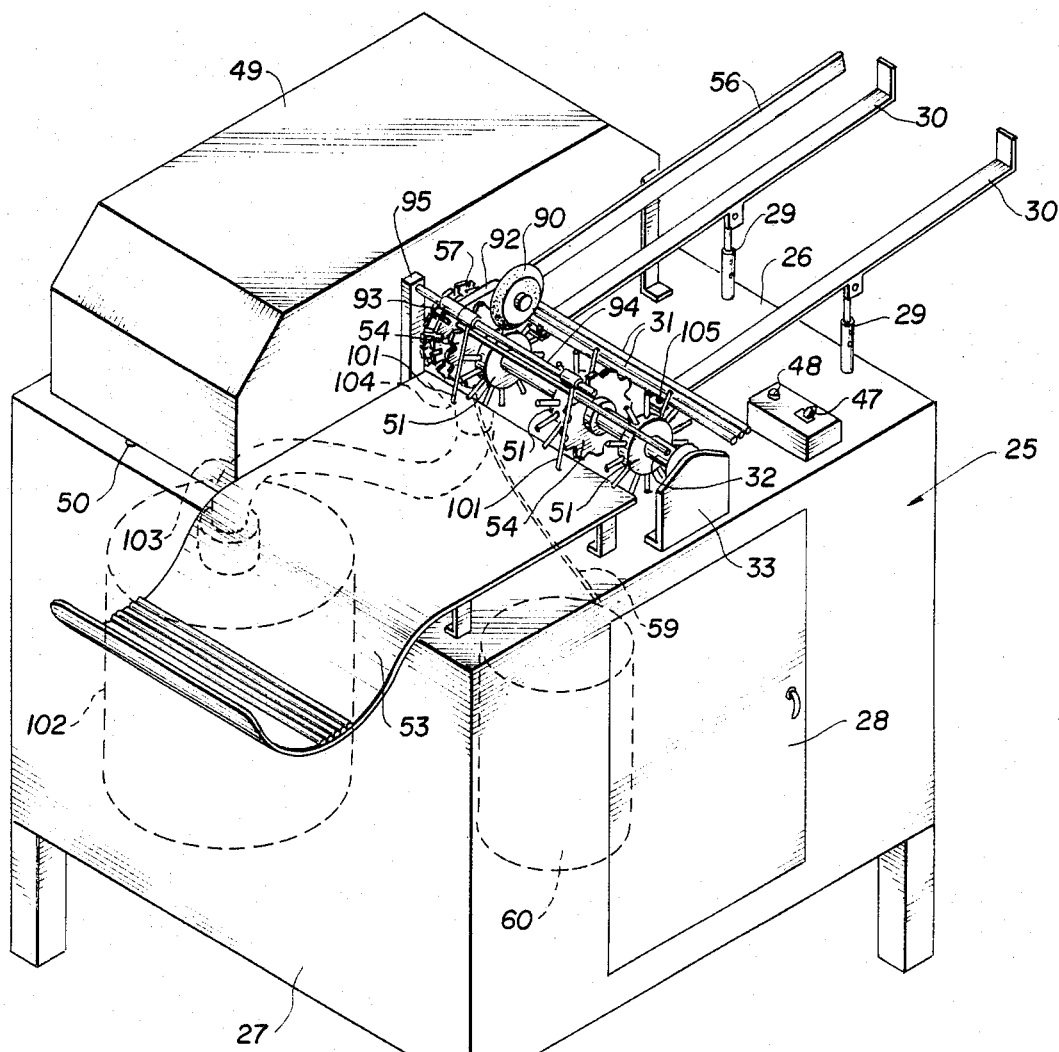
FIG.1
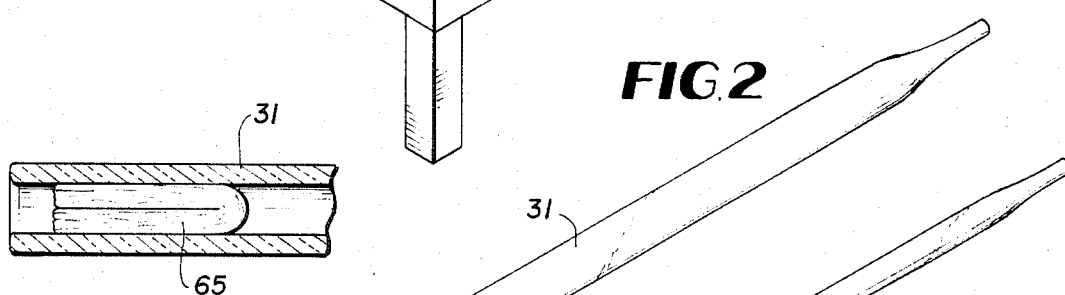
FIG.2
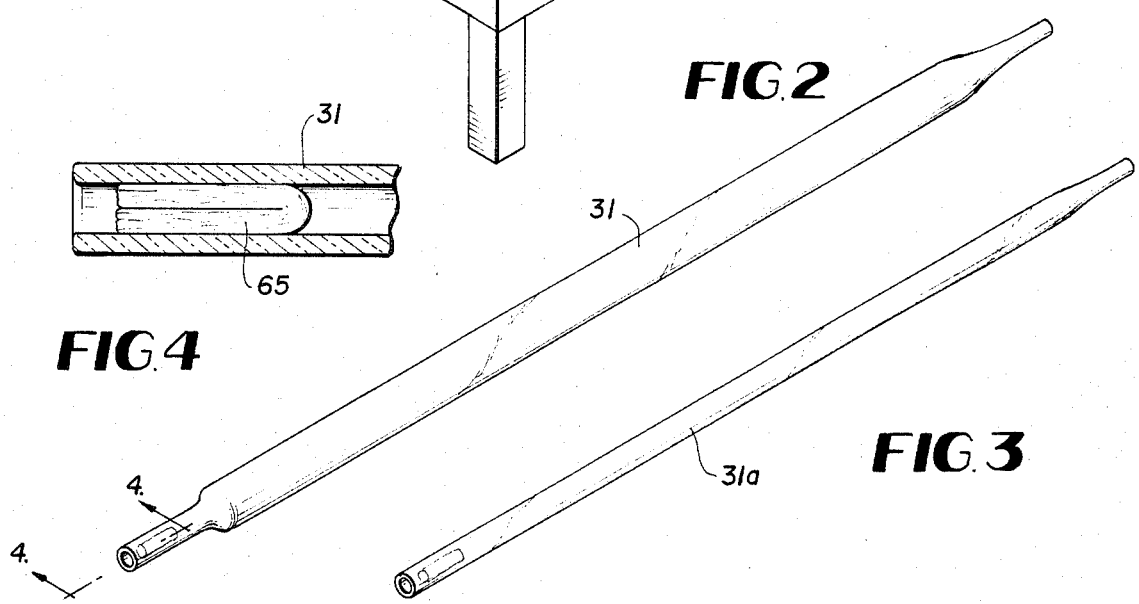
FIG.4
FIG.3

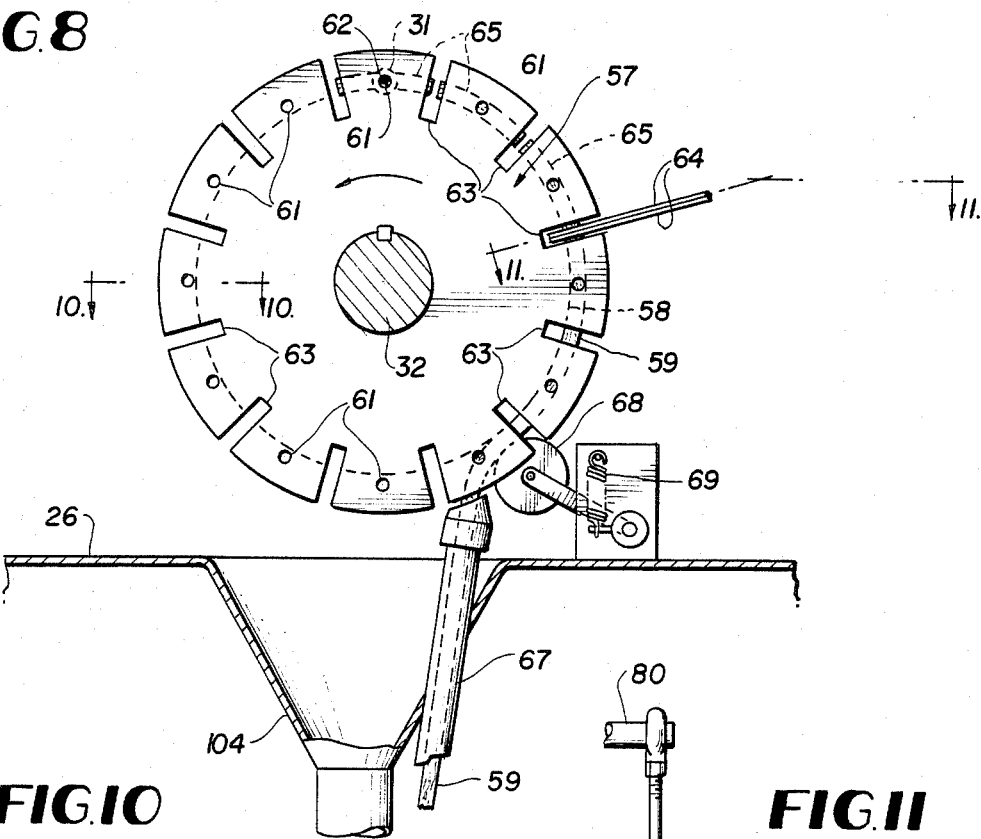
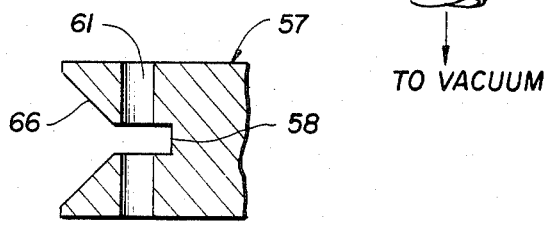
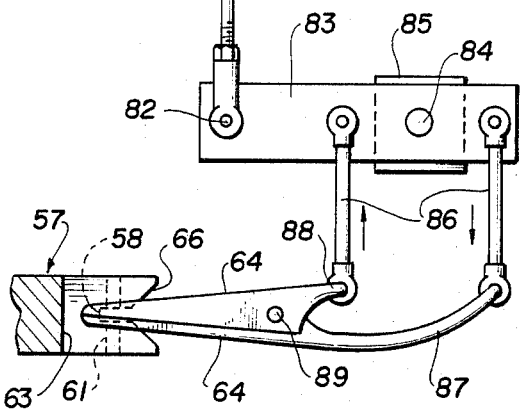
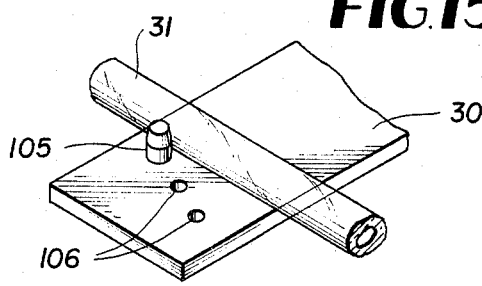
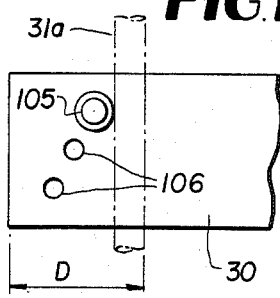
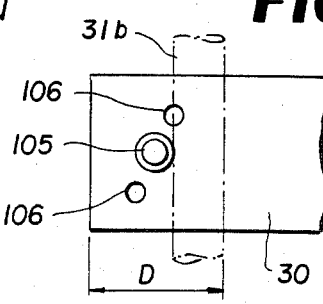
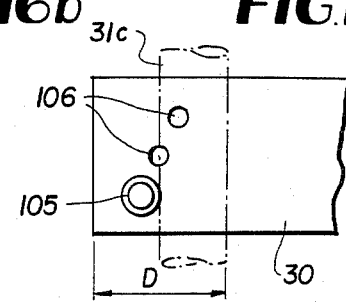

AUTOMATED PIPET PLUGGING MACHINE

BACKGROUND OF THE INVENTION

The present invention seeks to satisfy a need for an efficient, relatively simple and rapidly acting machine for installing cotton plugs into pipets in a completely automatic sequence. Heretofore, pipets have been plugged manually or by the operation of semi-automatic means where each pipet is manually held at a plugging station.

An important object of the invention is to provide a fully automated pipet plugging machine which can act on pipets of almost any length and in a variety of diameters, the latter adaptation requiring the mere repositioning of a single stop element on the inclined pipet delivery rails of the machine, thereby eliminating the necessity for any other machine adjustments.

A further object of the invention is to provide a machine of the above type which is compact, easy to maintain and durable.

Other features and advantages of the invention will become apparent to those skilled in the art during the course of the following description.

BRIEF DESCRIPTION OF THE DRAWINGS

FIG. 1 is a perspective view of a machine for plugging pipets according to the present invention.

FIGS. 2 and 3 are perspective views of typical pipets of different sizes, which the machine can plug automatically.

FIG. 4 is an enlarged fragmentary vertical section taken on line 4—4 of FIG. 2 and showing an installed pipet plug.

FIG. 8 is a similar view taken on line 8—8 of FIG. 5 and showing a cotton roving transport wheel and associated elements of the machine.

FIG. 10 is an enlarged fragmentary section taken radially through the roving transport wheel on line 10—10 of FIG. 8.

FIG. 11 is a similar section taken on line 11—11 of FIG. 8.

FIG. 15 is a fragmentary perspective view of a pipet adjustable position stop element.

FIGS. 16a, 16b and 16c are a series of fragmentary plan views showing the use of the multi-position stop element with pipets of different diameters.

DETAILED DESCRIPTION

Figure 17:
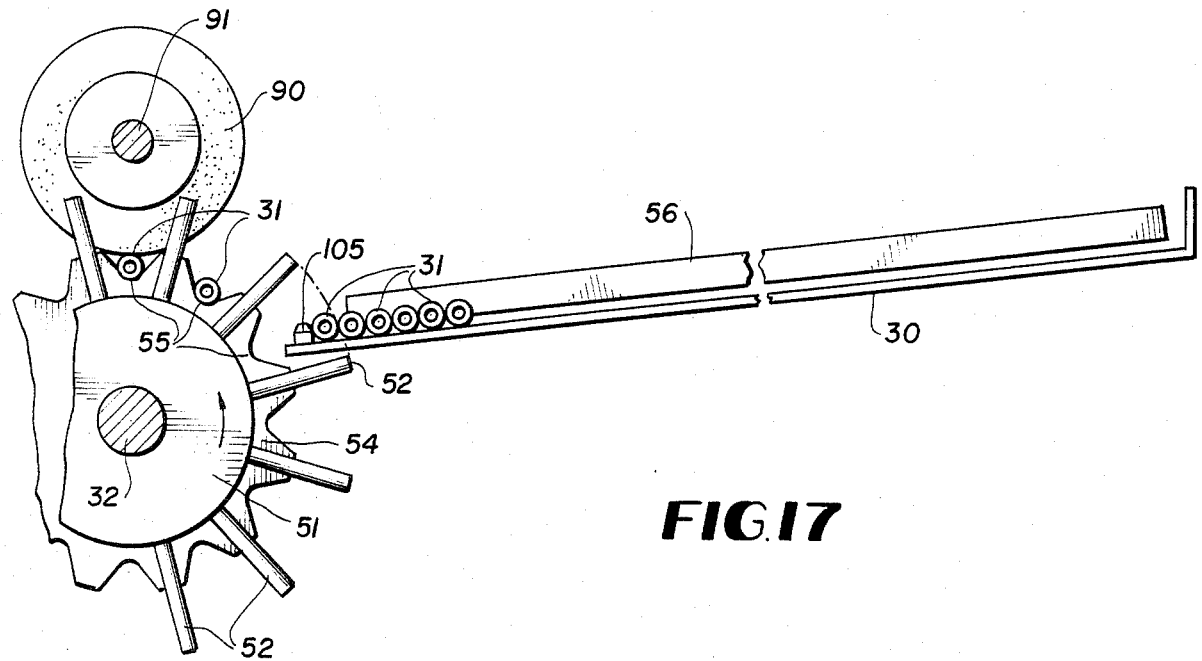
FIG. 17 is a fragmentary sectional view showing the pipet transport and locator wheels adjacent the pipet delivery rails and the stabilizing wheel engaging a pipet at the plugging station.

Referring to the drawings in detail, an automated pipet plugging machine 25 according to the invention comprises a supporting table 26 below which a cabinet or housing structure 27 is provided having an acess door 28. Adjustably held on and above the table 26 through adjustable height columns 29 is a pair of parallel inclined pipet delivery rails 30 on which a supply of pipets 31 of any chosen diameter is placed by hand at required times to enable the machine to plug the pipets continuously and rapidly in an automatic mode. The rails 30 can accommodate pipets of varying lengths in one chosen diameter at any given time. By making one simple adjustment, to be described, pipets of other diameters in varying lengths can also be plugged automatically by the machine. The inclined delivery rails 30 slope downwardly from one side of the table 26, namely the pipet input side, toward the center of the table, as shown in FIGS. 1 and 17. The delivery rails 30 terminate near the center of the table 26, as shown.

Figure 5:
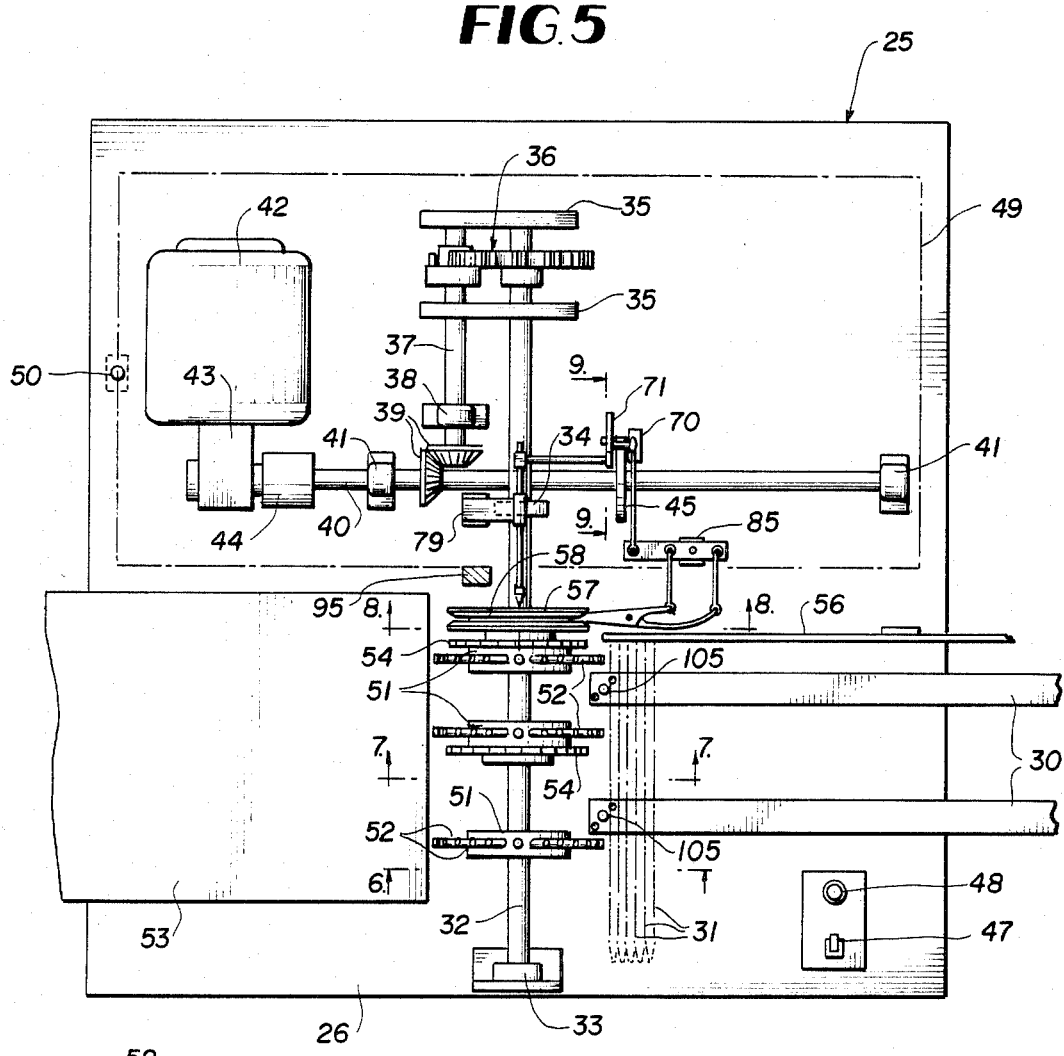
FIG. 5 is a plan view of the machine, with parts omitted and parts in section.
Figure 6:
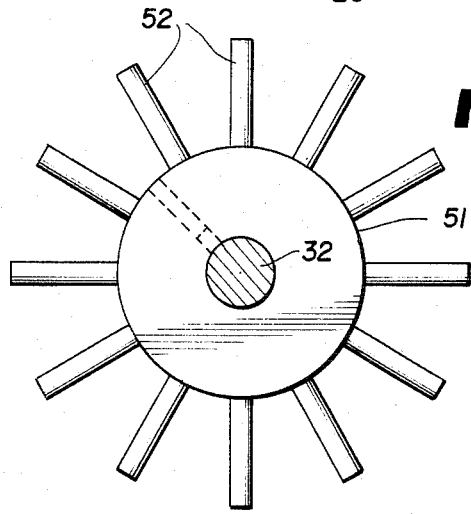
FIG. 6 is an enlarged vertical section taken on line 6—6 of FIG. 5 showing a pipet transport wheel.
Figure 7:
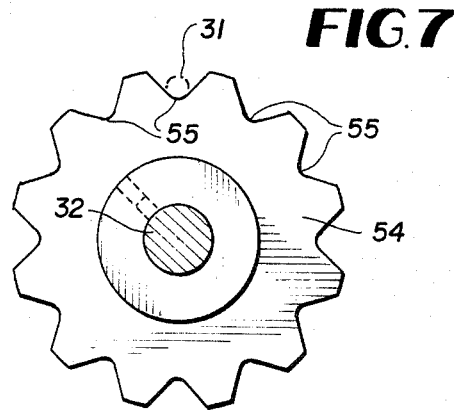
FIG. 7 is a similar view taken on line 7—7 of FIG. 5 showing a pipet locator wheel.

At the approximate center of the table 26 and slightly thereabove, and disposed at right angles to the rails 30 and across the same is a horizontal intermittently driven rotary transport shaft 32. A support bearing 33 for this shaft is provided on the table at one end of the shaft. An intermediate bearing 34 for the shaft 32, FIG. 5, is preferably provided and the far end of the shaft 32 is further supported by table mounted plates 35 forming a part of a conventional Geneva motion 36 through which the transport shaft is intermittently driven. The Geneva motion is a twelve station motion which imparts twelve intermittent partial rotations to the shaft 32, intervened by an equal number of shaft dwell periods of equal duration.

The Geneva motion 36 is powered by a countershaft 37 parallel to the shaft 32 and having a support bearing 38. The countershaft 37 is driven through a pair of equal size bevel gears 39 from a drive shaft 40 extending at right angles to the shafts 32 and 37, the shaft 40 crossing beneath the shaft 32, as shown in FIG. 5. The drive shaft 40 is supported in table mounted bearings 41.

The shaft 40 is driven by an electric motor 42, connected with a speed reducer 43, and a safety clutch 44 delivers rotational power from the speed reducer to the drive shaft 40. This clutch, whose torque transmitting ability is adjustable, will slip if the fingers of an attendant should become jammed in a rotating part of the machine. A rotary cam disc 45 having a projecting pin 46 is fixed on the drive shaft 40 beyond the side of transport shaft 32 away from the motor 42. The purpose of this cam disc will be described.

The electric motor 42 comprises the only power drive means for the machine. An on-off switch 47 for the motor 42 and visual indicator light 48 are provided on one corner of the table 26. The motor 42, Geneva motion 36, shafts 37 and 40 and associated elements, as well as part of the shaft 32, are housed within a cover 49 in the interest of further safety. This cover is readily removable. A safety switch 50 beneath one edge of the cover 49 interrupts power to the motor 42 whenever the cover 49 is removed, independently of the on-off switch 47.

The two shafts 40 and 37 are driven at the same speed continuously by the motor 42 and gears 39. Fixed on the intermittent rotary transport shaft 32 are three axially spaced identical pipet transport wheels 51, each having preferably twelve equidistantly spaced radial pins 52, by means of which individual pipets 31 are lifted from the inclined rails 30 and carried on a rotary path to the plugging station of the machine, and from this station, after the plugging operation, each plugged pipet is discharged onto a collection apron 53, fixed on the table 26 at the downstream side of the machine away from the rails 30. As shown in FIG. 5, the two rails 30 are disposed interiorly of the pin 52 of the two endmost transport wheels 51.

Closely adjacent to the intermediate and innermost transport wheels 51 are two pipet precision locator wheels 54 having tapered pockets 55 in their peripheries within which pipets 31 are seated during their travel with the transport wheels 51. The locator wheels 54 are fixed to intermittent shaft 32 with the pockets 55 aligned with the spaces between the radial pins 52 of the transport wheels, as best shown in FIG. 17. The pockets 55 correspond in number to the pins 52. The locator wheels 54 turn in unison with the transport wheels 51 on the twelve station intermittently driven and dwelling transport shaft 32, whereby each pipet 31 in succession is precisely held for the necessary time interval at the plugging station of the machine, as will be further described.

A vertical gage rail 56 of the machine disposed immediately above the innermost pipet delivery rail 30 is adapted to abut the interior ends of pipets 31 on the inclined rails 30 to assure that the pipets do not shift too great a distance toward the cover 49 in their travel on the rails 30 and are properly positioned to be plugged at the plugging station by the plugging means, yet to be described.

Also secured to the intermittent shaft 32 slightly inwardly of the innermost transport wheel 51 is a cotton roving transport wheel 57 shown in detail in FIGS. 8 and 10. This wheel has an annular groove 58 within which the cotton roving 59 drawn from a roving supply 60 within the cabinet 27 becomes engaged. The groove 58 of roving wheel 57 is intersected at twelve circumferentially equidistantly spaced locations by axial through openings 61 which receive a plugging needle 62 at the plugging station of the machine during swell periods of the shaft 32. Midway between the openings 61 of roving wheel 57, an equal number of radial roving severing slots 63 are provided in the wheel 57, FIGS. 8 and 11. At a roving severing station of the machine, while the shaft 32 is at a dwell, scissor blades 64 are automatically operated within each slot 63 to cleanly sever the cotton roving 59 and produce equal length pipet cotton plugs 65. In the machine, FIG. 8, the severing station occupied by the scissor blades 64 is approximately at a two o'clock position of the wheel 57, the pipet plugging station being at the twelve o'clock position, indicated by the presence of a pipet 31, FIG. 8. As shown in FIG. 11, the severing slots 63 are radially deeper than the groove 58 so that the scissor blades 64 can cleanly cut the roving 59 while it is seated in the annular groove 58. The roving transport wheel 57 also has an annular flared entranceway 66 to guide the roving 59 toward the groove 58.

The roving 59 is pulled by the wheel 57 from the supply 60 through a fixed guide tube 67. As the roving emerges from the guide tube 67 above the table surface 26, it is engaged by a small guide or placement wheel 68 held on the table 26 and urged upwardly by a spring 69. The small wheel forces the roving 59 firmly into the bottom of the groove 58 where it is held frictionally.

Figure 9:
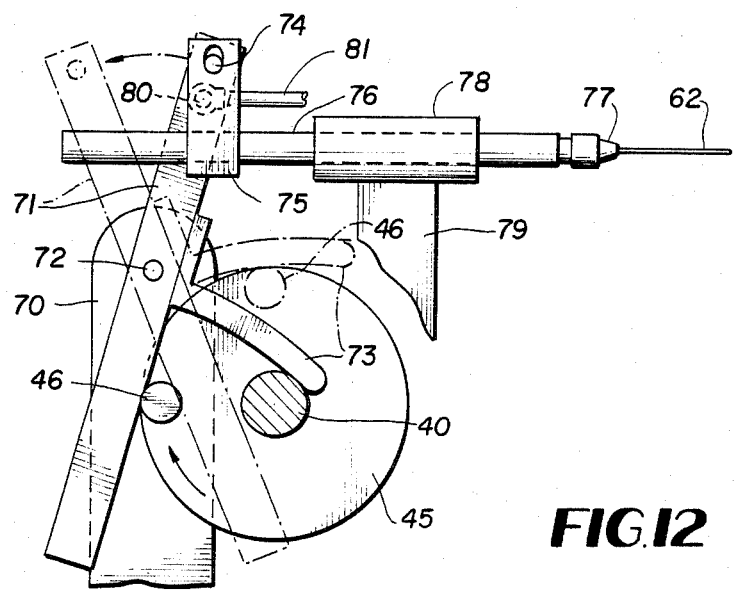
FIG. 9 is an enlarged fragmentary vertical section taken on line 9—9 of FIG. 5.
Figure 12:
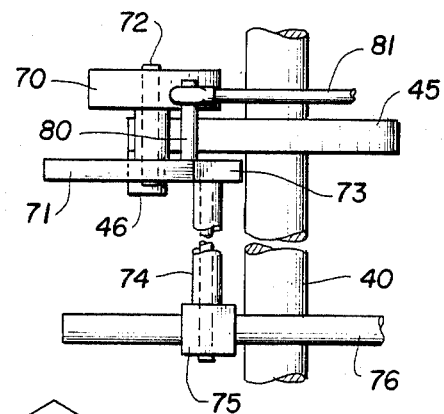
FIG. 12 is a fragmentary plan view taken on line 12—12 of FIG. 9.

The means shown in detail in FIGS. 9, 11 and 12 coordinate the activity of the scissor blades 64 and the plugging needle 62 while the twelve station intermittently rotated shaft 32 is at each dwell position. This means includes the cam disc 45 on drive shaft 40 having the previously-noted pin 46.

A support post 70 on the table 26 near the rotating disc 45, FIG. 5, has a vertically swingable lever arm 71 pivoted thereto by a pin 72. The lever arm 71 carries a curved cam finger 73 projecting from one side thereof across the rotational path of travel of the pin 46. During rotation of the shaft 40 and disc 45, the pin 46 engages the pivoted lever arm 71 and moves it to the full line position in FIG. 9 which is the pipet plug inserting position. The top of pivoted lever arm 71 is further connected through a lost motion connection 74 to a movement block 75 fixed to a horizontal plunger rod 76 carrying a holding chuck 77 for pipet plugging needle 62 at the plugging station. The plunger rod 76 is mounted for horizontal reciprocation in a sleeve 78 fixed to the top of a post 79 on the table 26 near the crossing point of shafts 40 and 32, FIG. 5.

Figure 13A:
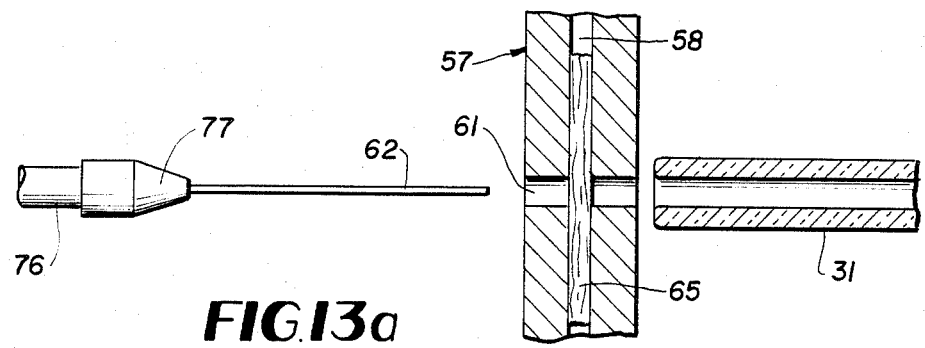
FIGS. 13a, 13b and 13c are a series of cross sectional views depicting the installation of a cotton plug in a pipet by the machine.
Figure 13B:
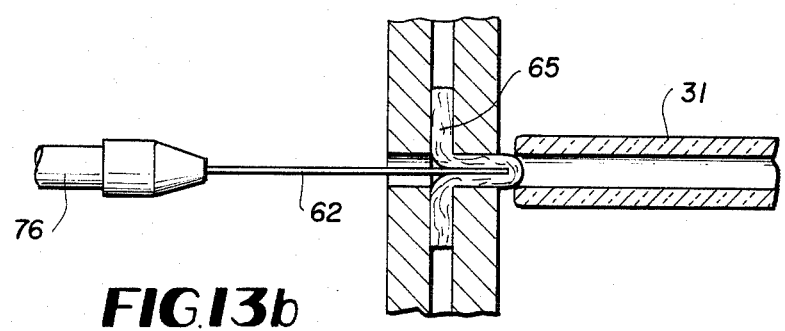
Figure 13C:
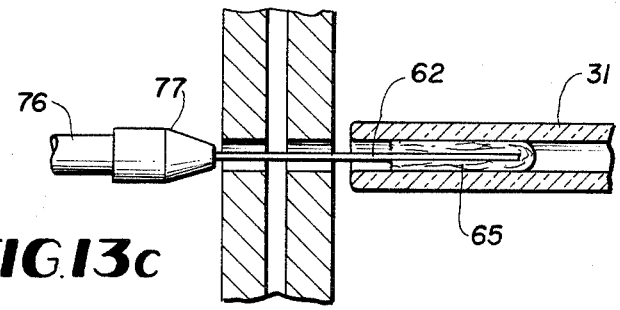

When the lever arm 71 is moved to its full line position in FIG. 9 by the pin 46, the plugging needle 62 has moved from the retracted position shown in FIG. 13a through the intermediate position of FIG. 13b to the final position of FIG. 13c which corresponds to the position shown in FIG. 9. As shown in FIGS. 13a, 13b and 13c, one of the severed cotton plugs 65 is progressively engaged by the needle 62 which enters one of the openings 61 of the wheel 57 at the plugging station and forces the plug 65 into the bore of a pipet 31 being held at the plugging station, while simultaneously folding the cotton plug upon itself.

After the cotton plug is fully inserted by the needle 62, FIG. 13c, the cam pin 46 begins to engage the cam finger 73 and drives the pivoted lever arm 71 rearwardly on the pivot 72 toward the phantom line position shown in FIG. 9. In this position of the lever arm 71, the plunger 76 and needle 62 are retracted to the position shown in FIG. 13a ready to engage another oncoming plug 65 in the wheel groove 58 at the plugging station which is at the twelve o'clock position in FIG. 8, as previously stated, the needle 62 then entering another of the wheel openings 61 while the shaft 32 is at another dwell.

Simultaneously with each plug insertion, as above described, the scissor blades 64 are activated at the severing station to sever the roving 59 and produce another cotton plug 65. This occurs in the following manner. A side projecting pin 80 on the lever arm 71 near its upper end, and extending away from the block 75, FIG. 12, is coupled with a connecting rod 81 which extends parallel to the plunger rod 76 and horizontally. As shown in FIG. 11, the far end of this connecting rod is pivotally connected at 82 to a horizontally swinging lever 83 connected through a vertical axis pivot 84 to an upstanding support post 85 on the table surface 26, FIG. 5, inside of the area of cover 49. All of the operational components shown in FIGS. 9, 11 and 12 are under the cover 49, and therefore are concealed in FIG. 1.

The swinging lever 83, on opposite sides of its pivot 84, is connected through a pair of motion transmitting links 86 to extensions 87 and 88 of the scissor blades 64 which are pivotally interconnected at 89. As a consequence of this construction and its mode of operation following movement of the pin 80 on the vertically swinging lever arm 71, the scissor blades at the approximate two o'clock severing station, FIG. 8, are cyclically closed within each radially slot 63 to sever the roving 59 during each dwell period of the shaft 32 and wheel 57. Following each severing, the blades 64 are separated to clear the wheel 57 during its next increment of rotation caused by the Geneva motion 36. In other words, the mechanisms in FIGS. 9, 11 and 12 coordinate the operation of the plug inserting needle 62 and scissor blades 64 with the incremental rotation of shaft 32, whereby each pipet 31 in succession is plugged.

Figure 14:
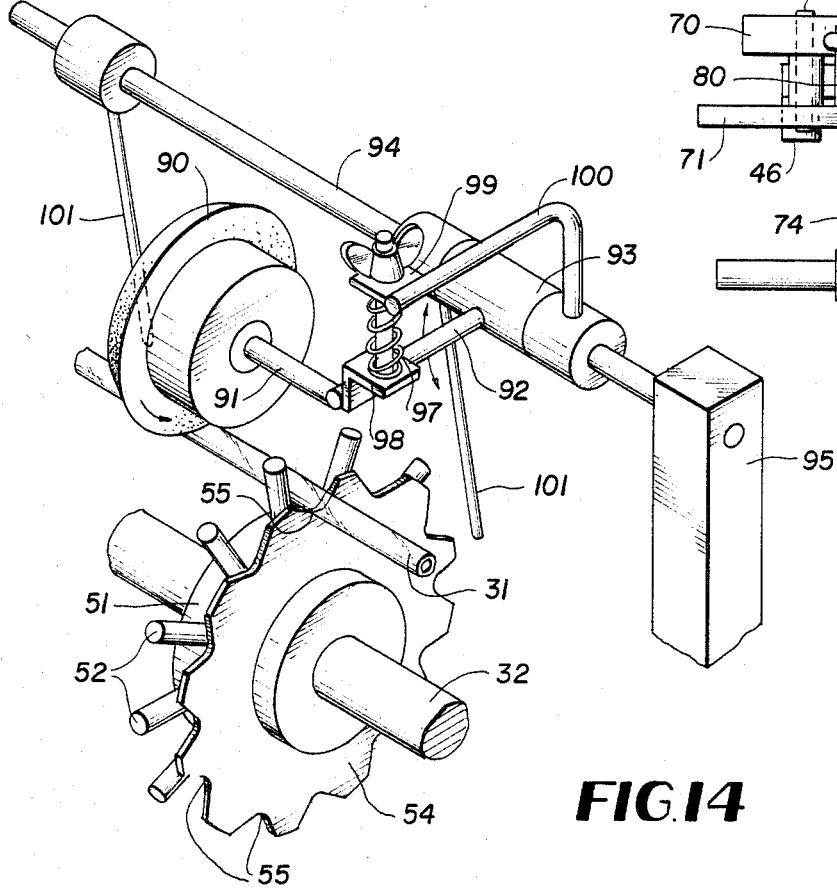
FIG. 14 is a fragmentary perspective view of a pipet holding or stabilizing wheel and associated elements of the machine.

While each pipet is being plugged in the manner described, it must be engaged and steadied at the plugging station to avoid axial displacement of the pipet. To accomplish this steadying or stabilizing of each pipet 31 at the plugging station, the mechanism in FIG. 14 is utilized. This mechanism comprises a preferably beveled rubber wheel 90 carried by a shaft 91, fixed or welded to a vertically swingable right angular arm 92 secured to a rotational sleeve 93 on a fixed horizontal support shaft 94, above and parallel to the shaft 32, FIG. 1. The shaft 94 at one end is supported by a post 95 on table 96 just outside of the cover 49, FIG. 5. The rubber wheel is biased downwardly by a spring 97 bearing on a bracket 98 fixed to the arm 92. The top of the spring bears against a plate 99 fixed to a non-rotatable arm 100 on the shaft 94. Thus, the rubber wheel 90 exerts a yielding adjustable downward stabilizing force on each pipet at the plugging station of the machine while the pipet is being accurately held in axial registration with the needle 62 by the pockets 55 of precision locator wheels 54.

After being plugged with cotton, each pipet 31 is further conveyed by the transport wheels 51 away from the plugging station and toward the collection apron 53. Eventually, each pipet is allowed to roll onto this apron and to be collected in a depressed end portion of the apron, as shown in FIG. 1. A pair of guard rods 101 depending from the fixed shaft 94 prevent the plugged pipets from moving in the wrong direction on the apron 53.

A further feature of the machine comprises the provision of a power vacuum source 102 within the cabinet 27 connected by a hose 103 to an upwardly facing funnel 104 which opens through the table surface 26 substantially below the roving transport wheel 57. The guide tube 57, FIG. 8, may pass through the funnel 104, as shown. The purpose of the vacuum system is to collect or remove excess lint or particles of cotton which may be generated by the repeated cutting of the roving 59 by the blades 64.

The machine possesses one more very important feature which enables it to service or plug pipets having a variety of different diameters such as the pipets 31a, FIGS. 3 and 16a, 31b and 31c. To enable this, the delivery rails 30 near their discharge ends are each equipped with a multi-position cylindrical stop pin 105, adapted to engage each pipet on the rails 30 and position it to be picked up cleanly by the pins 52 of transport wheels 51, without disturbing those pipets on the rails 30 behind the one being picked up, FIG. 17. Each rail 30 has three or more diagonally arranged locator openings 106 for the multi-location stop pin 105, FIGS. 16a, 16b and 16c. When slender pipets 31a are being handled by the machine, the stop pins 105 are placed as shown in FIG. 16a to position the pipets 31a on the rails 30 for clean picking up by the pins 52 of wheels 51. When larger pipets 31b are being handled, the stop pins 105 are placed in the middle openings 106, FIG. 16b, again for the same purpose of locating the pipets properly for picking up cleanly by the pins 52, FIG. 17. When still larger pipets 31c are being handled, the stop pins 105 are placed as in FIG. 16c for the same purpose. This very simple arrangement allows the machine to handle pipets of various diameters without the necessity for other machine adjustments. The machine is completely insensitive to the lengths of the pipets, regardless of their diameters.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A pipet plugging machine comprising a base, an intermittently driven rotational pipet transport shaft on the base, axially spaced coaxial pipet transport and locator wheels fixed on the transport shaft, a cotton roving transport wheel fixed on the transport shaft near one pipet locator wheel, inclined pipet delivery rails on the base extending from one side of the transport shaft at right angles thereto, a pipet collection apron on the base and extending from the opposite side of said transport shaft, a continuously driven rotational shaft on said base extending at right angles to the transport shaft and carrying a rotational cam element, said roving transport wheel having a peripheral roving groove, circumferentially spaced radial slots intersecting said groove, and a corresponding number of circumferentially spaced axial through openings between said slots intersecting said groove, a reciprocating horizontal axis needle device defining a pipet plugging station disposed coaxially of each through opening of the roving transport wheel when the latter is dwelling at the plugging station, scissor blades defining a cotton roving severing station disposed radially of the roving transport wheel and adapted to sever a roving in the groove of such wheel by entering each radial slot of such wheel at the severing station while such wheel is dwelling, and mechanism on said base actuated by said rotational cam element and being operatively connected to said needle device and scissor blades to operate the same in timed relationship with dwell periods of the intermittently driven rotational pipet transport shaft.

2. A pipet plugging machine as defined in claim 1, and a single drive motor on the base operatively coupled with the intermittently driven rotational pipet transport shaft and said continuously driven rotational shaft.

3. A pipet plugging machine as defined in claim 2, and an intermittent motion mechanism connected between said motor and said pipet transport shaft.

4. A pipet plugging machine as defined in claim 3, and said intermittent motion mechanism comprising a Geneva mechanism.

5. A pipet plugging machine as defined in claim 1, and means on said base engaging each pipet at the plugging station of the machine to steady it during the plugging operation.

6. A pipet plugging machine as defined in claim 5, and said means comprising a yielding device bearing down on each pipet at the plugging station.

7. A pipet plugging machine as defined in claim 6, and each pipet transport wheel including a plurality of circumferentially spaced radial pins adapted to lift pipets one at a time from said delivery rails, and each locator wheel having peripheral pipet locator pockets between each pair of pins of the transport wheel by means of which pipets are held with precision at the plugging station in coaxial relationship with said reciprocating horizontal axis needle device.

8. A pipet plugging machine as defined in claim 1, and a multi-position stop element on each pipet delivery rail near its discharge end adapted to be engaged by pipets of various diameters being delivered into the machine and positioning the pipets on the rails for picking up cleanly one at a time by said pipet transport wheels.

9. A pipet plugging machine as defined in claim 8, and said rails having plural positioning openings for the multi-position stop element, and said openings being arranged in spaced relationship in a diagonal row across each rail.

10. A pipet plugging machine as defined in claim 1, and said mechanism on the base actuated by the rotational cam element including a rotational cam operated vertically swingable lever connected with the reciprocating horizontal axis needle device, and a horizontally swingable lever connected with the scissor blades and being operatively linked to the vertically swingable lever.

11. A pipet plugging machine as defined in claim 1, and a vacuum system on the base having an opening through the top of the base near and below said roving transport wheel.

12. A pipet plugging machine as defined in claim 11, and a spring-urged element on the base near the roving transport wheel and engaging a cotton roving during its delivery to such wheel and forcing the roving into said peripheral roving groove.

13. A pipet plugging machine as defined in claim 1, and a removable cover on the top surface of said base enclosing at least a part of said pipet transport shaft and said continuously driven rotational shaft and elements associated therewith.

14. A pipet plugging machine as defined in claim 13, and a safety stop switch on said base and being normally open and held closed by the cover when the cover is in place on said base, the safety stop switch when open due to removal of the cover interrupting rotation of said continuously driven rotational shaft.

15. A pipet plugging machine comprising a support, an intermittent rotary pipet pick-up and transport means on the support, an inclined trackway leading to the support on one side of said means, multi-position pipet stop means on the trackway near said pick-up and transport means and abutting each leading pipet advancing on the trackway with the assistance of gravity and interrupting its movement on the trackway at a position enabling each leading pipet to be picked up and transported to a plugging station of the machine without disturbing other pipets on the trackway and enabling the machine to handle pipets of varying diameters by repositioning of the stop means, a pipet discharge and collection means leading away from the other side of the rotary pipet pick-up and transport means, means on the support engaging and steadying each pipet on the rotary pick-up and transport means at said plugging station, intermittent rotary drive means for said pipet pick-up and transport means causing the pick-up and transport means to dwell at a pipet plugging station, and means cyclically timed with the intermittent rotation and dwelling of the pick-up and transport means to insert a plug into one end of each pipet on the pick-up and transport means at the plugging station.

16. A pipet plugging machine as defined in claim 15, and an intermittent rotary cotton roving transport device on said pick-up and transport means, and cotton roving severing and plug forming means cyclically timed with the intermittent rotation and dwelling of said pick-up and transport means to sever the cotton roving on the cotton roving transport device during a dwell of the latter.

17. A pipet plugging machine as defined in claim 16, and a continuously rotating cam means to operate the cyclically timed means to insert a plug into one end of each pipet and to also operate the cotton roving severing and plug forming means.

* * * * *